United States Patent [19]
Mignien et al.

[11] 4,217,031
[45] Aug. 12, 1980

[54] MECHANICAL DEVICE FOR CONNECTING OPTICAL FIBRES

[75] Inventors: Georges Mignien; Christian Millet, both of Meyzieu, France

[73] Assignee: Les Cables de Lyon, Lyons, France

[21] Appl. No.: 938,142

[22] Filed: Aug. 30, 1978

[30] Foreign Application Priority Data

Sep. 14, 1977 [FR] France .................. 77 27726

[51] Int. Cl.² ............................................. G01B 5/14
[52] U.S. Cl. ................................................ 350/96.21
[58] Field of Search ....................................... 350/96.21

[56] References Cited
U.S. PATENT DOCUMENTS

| | | | |
|---|---|---|---|
| 3,885,859 | 5/1975 | Dalgleish et al. | 350/96.21 |
| 4,056,305 | 11/1977 | McCartney et al. | 350/96.21 |
| 4,132,461 | 1/1979 | Jacques et al. | 350/96.21 |
| 4,142,777 | 3/1979 | Gauthier et al. | 350/96.21 |

FOREIGN PATENT DOCUMENTS 2363986 7/1975 Fed. Rep. of Germany ........ 350/96.21

*Primary Examiner*—Rolf. G Hille
*Attorney, Agent, or Firm*—Sughrue, Rothwell, Mion, Zinn and Macpeak

[57] ABSTRACT

A mechanical device for connecting optical fibres together by single or multiple connections with little attenuation loss. The connector has a body in the form of a cylinder, end pieces which support three cylindrical rods enclosing the fibre and disposed in guiding V-grooves, covers associated with the end pieces by spring washers which enable the cover to be longitudinally snap-fitted onto the body and a deformable blade which presses transversally against the rods.

8 Claims, 4 Drawing Figures

MECHANICAL DEVICE FOR CONNECTING OPTICAL FIBRES

FIELD OF THE INVENTION

The present invention relates to a device for mechanically connecting optical fibres together including, for each junction, two end pieces each constituted by three cylindrical rods which are tangential to each other in pairs and which leave a channel between them for the optical fibre to pass through, each of the groups of three rods being disposed inside a V-shaped groove whose support is associated with a circular cylinder, each of the end pieces being associated with an end cover, the groups of three rods being prevented from moving by means which bear transversally on two of the three rods.

BACKGROUND OF THE INVENTION

The optical fibres must be connected accurately; these connections may be permanent connections or splices, or detachable connections.

There are several mechanical methods of connecting fibres, but such methods are generally cumbersome and complicated and require very high precision machining to maintain the fibre ends opposite each other within acceptable tolerances.

It is known to align two optical fibres end to end by means of a channel defined by three solid metal cylinders which are tangential to one another, in pairs. One already known method consists in forming two end pieces for each junction, each end piece being constituted by three cylindrical rods which are tangential in pairs which leave a channel between them for an optical fibre to pass, each group of three rods being disposed inside a V-shaped groove; the three rods are prevented from moving by transverse bearing means (see the Applicants' U.S. Pat. No. 4,142,777. These means for preventing movement consist of clamping pads or of a elastomer cylinder. However, this method does not give full satisfaction with respect to attenuation losses from one fibre to the next.

The device according to the present invention remedies these drawbacks and provides improved performances with respect to the prior art.

SUMMARY OF THE INVENTION

In accordance with the invention, said means for preventing movement include a resiliently deformable blade disposed between said circular cylinder and said groups of rods and it further includes means for preventing said body from moving longitudinally in relation to said cover and means for resiliently returning the ends of the rods against one another, said means being disposed between said end piece and said cover.

An embodiment of the present invention will be described hereinbelow purely by way of illustration and having no limiting character, with reference to the accompanying drawings.

Figure 1:
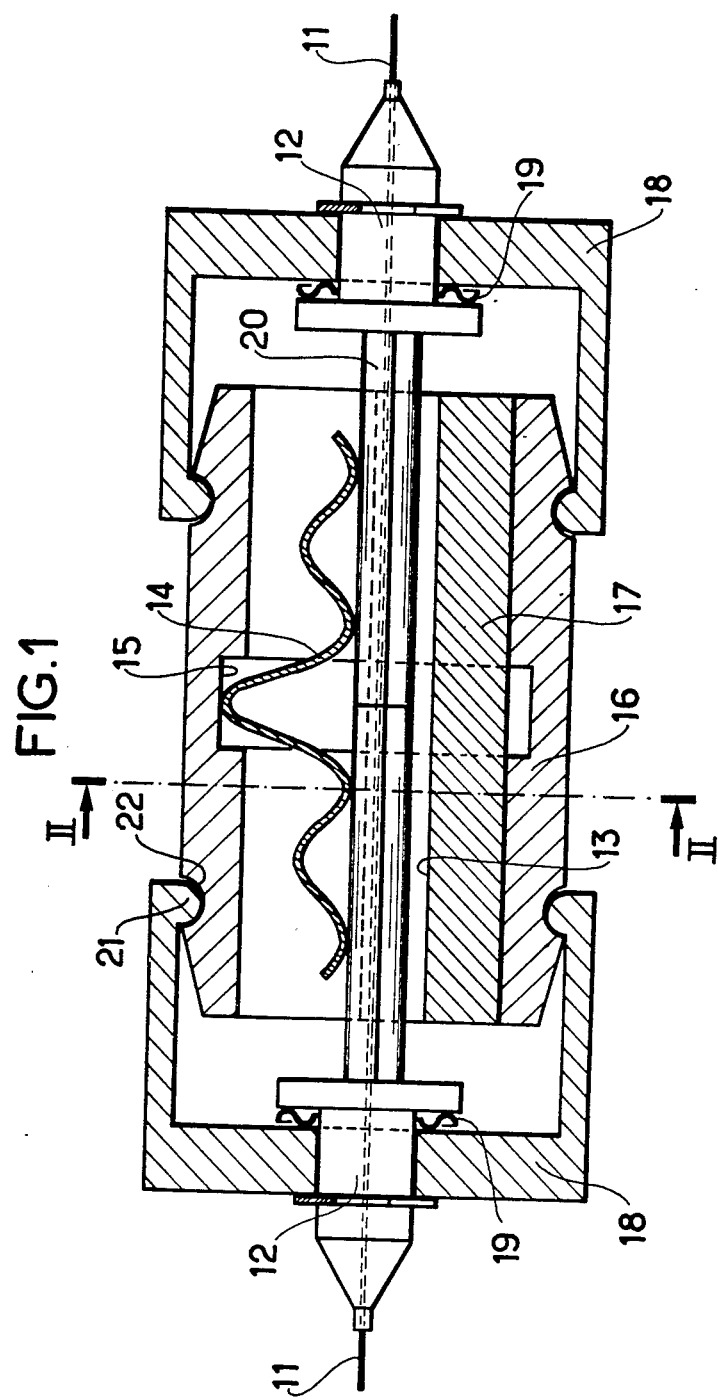
FIG. 1 is a longitudinal cross-section of a single-fibre connector which uses the bearing devices with resiliently deformable components.
Figure 2:
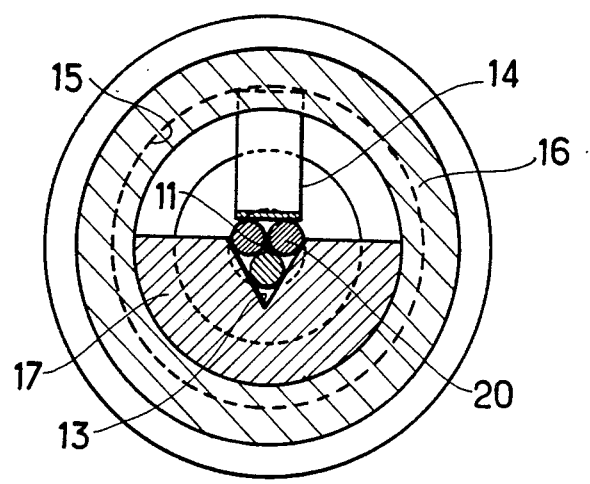
FIG. 2 is a transversal cross-section through II—II in FIG. 1 of the same single-fibre connector.

As in FIGS. 1 and 2, which show a single-junction optical fibre connector, the optical fibres 11 covered with a thermoplastic material are fitted with end pieces 12; said end pieces are integral with three cylindrical metal rods 20 which are tangential to one another in pairs and slide on assembly in a V-shaped groove 13 whose V is at an angle of 60°. A resilient metal blade 14 made, for example, of steel is prevented from moving in translation by a circular inside groove 15; it presses the end piece into the groove 13, either directly or by means of a flat blade made of a plastics material such as methyl polymethacrylate (not shown).

One advantage of the deformable blade is that it bears against one or several points of the end piece, thereby improving guiding. Further, the end piece may be slid directly under the blade 14.

The principal components of the single-junction connector are a cylindrical body 16 in which the deformable blade 14 and a semicylindrical machined part 17 which supports the V-shaped groove 13 are inserted. Covers 18, whose inside rims are snap-fitted into grooves 22 in the body 16 and which contain the end pieces 12, are installed on each end, the end pieces being installed movably in the covers. After installation, spring washers 19 press the ends of the end pieces 12 against the covers 18, thereby pushing back the ends of the rods 20 against one another; thus, after the connector has been opened and closed, constant contact pressure of the end pieces against each other is obtained. Further, when the covers are snap-fitted into the grooves 22, the three inside components are positioned by equilibrium of forces. The covers 18 could also be fixed on the body 16 by threads or by a bayonet system, although the illustrated fixing means seem preferable.

Figure 3:
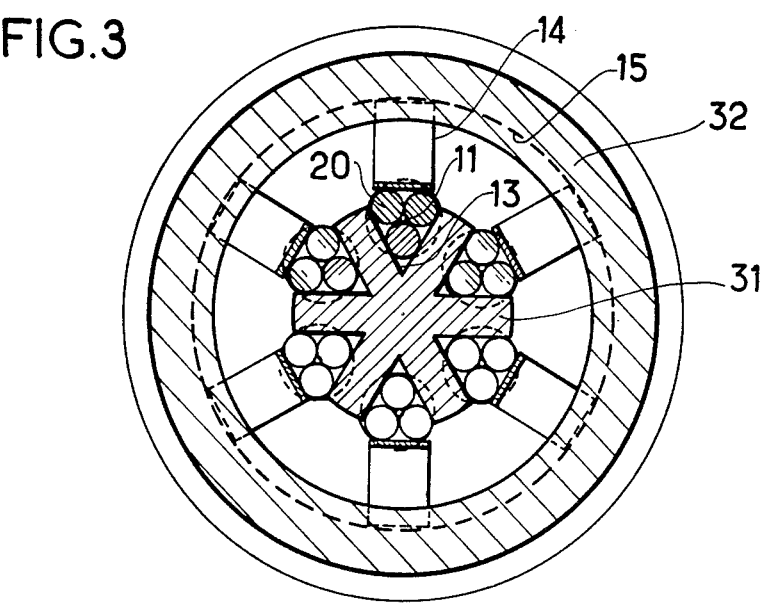
FIG. 3 is a transversal cross-section of a multi-fibre connector forming a second embodiment of the invention which uses the resiliently deformable bearing means.

FIG. 3 is the transversal cross-section of a multi-fibre connector in which a central core 31 which supports the V-shaped grooves 13 is positioned by the deformable blades 14 in the centre of a cylinder 32 provided with a groove such as 15. By way of example, the connector shown can connect six fibres.

Figure 4:
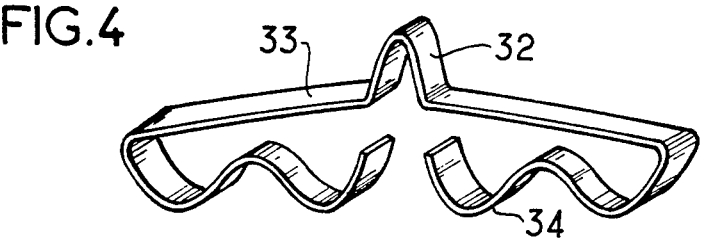
FIG. 4 shows a variant of a resilient blade forming a part of the connector of this invention.

FIG. 4 is a perspective view of another embodiment of the deformable blade in which the blade also bears against one or several points of the end piece 12 at the lower part of the blade. The central bend 32, designed to bear in the bottom of the groove 15 of the body 16, is extended by lateral arms 33 and parts 34 bent under the lateral arms, designed to press resiliently against the rods.

We claim:

1. A mechanical device for connecting optical fibres together, said device including, for each junction, two end pieces each constituted by three cylindrical rods, said rods being tangential to each other in pairs and leaving a channel between them for the optical fibre to pass through, each of the groups of three rods being disposed inside a V-shaped groove of a support associated with a circular cylinder, end covers bearing respectively said end pieces, means bearing transversely on two of the three rods for preventing the groups of three rods from moving, the improvement wherein said means for preventing movement include a resiliently deformable blade disposed between said circular cylinder and each group of rods, and said device further including means disposed on said cylinder and said covers for preventing said cylinder from moving longitudinally in relation to said covers, and means disposed between at least one of said end pieces and its cover for resiliently returning the ends of the rods against one another.

2. A device according to claim 1, wherein the resilient return means are constituted by a spring washer disposed between a shoulder of at least one of said end pieces and the end of its cover.

3. A device according to claim 1, wherein said elastically deformable blade includes longitudinally spaced portions which bear on said cylindrical rods at several points.

4. A device according to claim 3, wherein said cylinder has a circular inside groove and a portion of said blade resides within said groove and prevents said resiliently deformable blade from moving in translation.

5. A device according to claim 4, wherein said resiliently deformable blade has a central bend which bears in the bottom of the circular inside groove and lateral bends which bear against the rods.

6. A device according to claim 4, wherein said resiliently deformable blade has a central bend which bears in the bottom of the circular inside groove of the lateral arms and bends under the lateral arms and bearing on the rods.

7. A mechanical device according to claim 1, wherein said resiliently deformable blade is symmetrical with respect to the plane of contact of the ends of the rods.

8. A mechanical device according to claim 1, wherein said means for preventing said cylinder from moving longitudinally comprise snap fitting means interengating said covers to said cylinder at respective ends thereof.

* * * * *